United States Patent [19]

McMahon et al.

[11] Patent Number: 5,230,211
[45] Date of Patent: Jul. 27, 1993

[54] PARTIAL OXIDATION OF SEWAGE SLUDGE

[75] Inventors: Matthew A. McMahon, Wappingers Falls, N.Y.; Michael C. Martin, Houston, Tex.; Kenneth W. McKenzie, Apple Valley, Calif.

[73] Assignee: Texaco Inc., White Plains, N.Y.

[21] Appl. No.: 685,338

[22] Filed: Apr. 15, 1991

[51] Int. Cl.$^5$ .............................................. F02C 3/28
[52] U.S. Cl. ............................... 60/39.02; 48/197 A; 48/206; 48/DIG. 7; 110/346; 60/39.05
[58] Field of Search ................. 48/197 R, 197 A, 202, 48/206, 209, DIG. 7; 252/373; 44/280, 281, 282, 605; 110/341, 392, 346, 347, 348; 60/39.02; 210/769, 758, 763, 790, 774; 69/39.05

[56] References Cited

U.S. PATENT DOCUMENTS

| | | | |
|---|---|---|---|
| 3,544,291 | 12/1970 | Schlinger et al. | 48/206 |
| 3,687,646 | 8/1972 | Brent et al. | 48/209 |
| 3,847,564 | 11/1974 | Marion et al. | 48/95 |
| 3,874,592 | 4/1975 | Buschmann et al. | 239/132 |
| 4,052,176 | 10/1977 | Child et al. | 55/32 |
| 4,081,253 | 3/1978 | Marion | 48/197 |
| 4,405,332 | 9/1983 | Rodriguez et al. | 44/280 |
| 4,525,175 | 6/1985 | Stellaccio | 48/86 |
| 4,933,086 | 6/1990 | McMahon et al. | 210/603 |
| 4,983,296 | 1/1991 | McMahon et al. | 210/761 |
| 5,037,561 | 8/1991 | Copeland | 210/769 |
| 5,072,679 | 12/1991 | Noland et al. | 110/346 |

OTHER PUBLICATIONS

Perry's Chemical Engineers' Handbook, McGraw-Hill, Fourth Edition, 1963, pp. 19-50.

Primary Examiner—Peter Kratz
Attorney, Agent, or Firm—James J. O'Loughlin; Albert Brent

[57] ABSTRACT

An improved process for the low-cost disposal of noxious municipal sewage sludge in a safe way without polluting the environment. In the process, a portion of a stream of dewatered sewage sludge having a solids content in the range of about 17 to 40 wt.% is dried to produce dried sewage sludge having a solids content in the range of about 75 to 99 wt.%. The dried sewage sludge is ground to a small particle size. A pumpable aqueous feed slurry having a solids content in the range of about 45 to 70 wt.% is produced comprising (a) solid carbonaceous fuel, (b) ground dried sewage sludge, and (c) sheared and/or unsheared dewatered sewage sludge. The parts by weight of (a):(b):(c) are respectively in the range of about 3 to 8:0.5 to 2:0.5 to 2, and preferably 6:1:1. The aqueous feed slurry is gasified in a free-flow partial oxidation gas generator. Synthesis gas, reducing gas or fuel gas is produced, Ash and slag are separated from the gas stream and safely disposed. Waste heat produced in the process may be used to dry the sewage sludge.

3 Claims, 1 Drawing Sheet

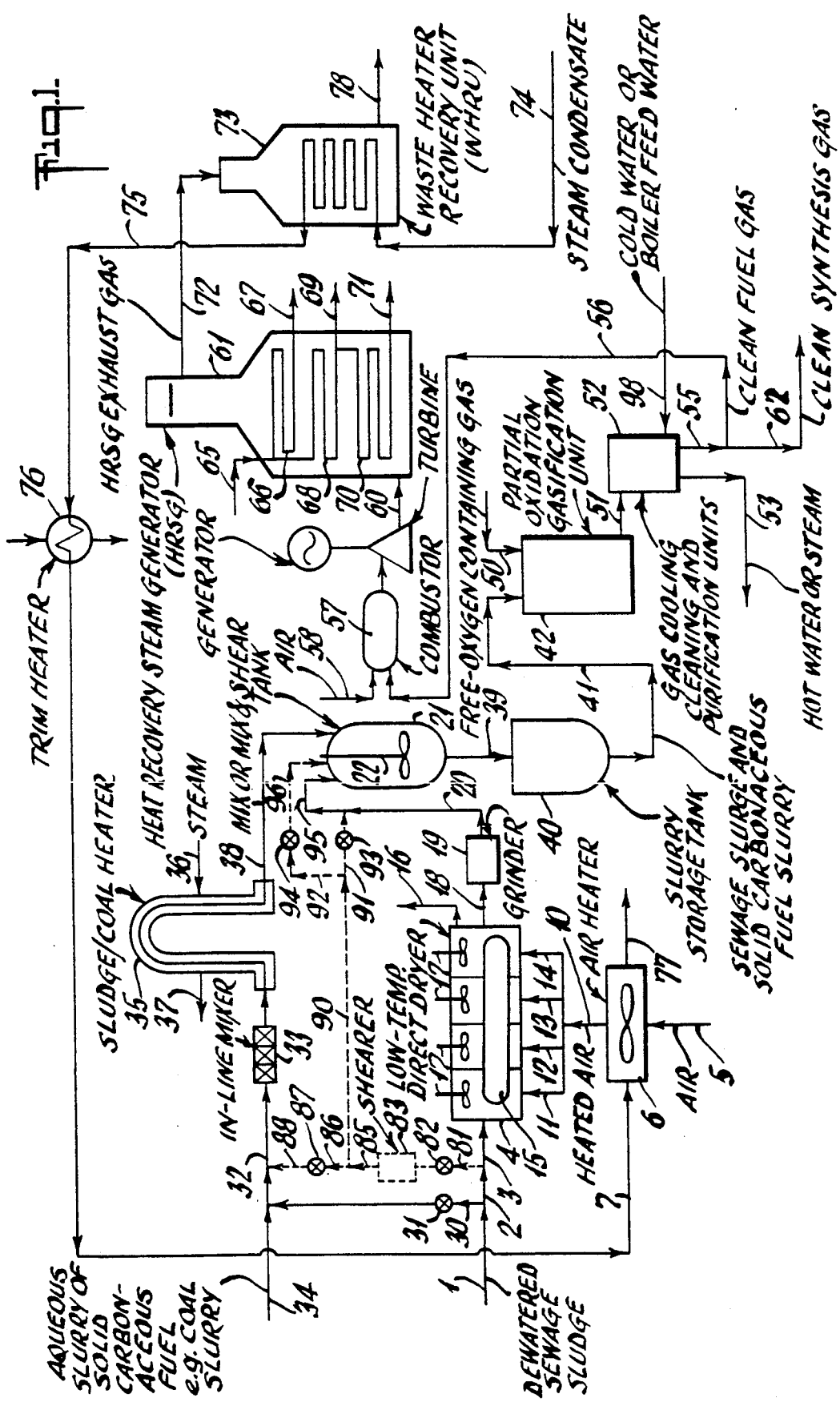

PARTIAL OXIDATION OF SEWAGE SLUDGE

FIELD OF THE INVENTION

This invention relates to a partial oxidation process for disposing of biological sewage sludge without polluting the nation's environment.

DESCRIPTION OF THE PRIOR ART

With landfills closing, ocean dumping being curtailed, and high-technology incinerators becoming unpopular in many areas, communities are finding that it is getting increasingly more difficult and expensive to dispose of their sewage sludge. The term "raw municipal sewage" as used herein may be broadly defined as "water-carried wastes", particularly from municipal sanitary sewage lines containing body wastes (excreta), household wastes, community waste such as street washings, etc., and some industrial wastes. The total solids content of the sewage in municipal lines is usually about 500 parts per million (p.p.m.) or more. The solids in sewage are mostly animal or vegetable substances, "organic matter," i.e. fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of organism may be found in sewage including bacteria, protozoa, spores and cysts.

Gasification of sewage sludge is described in coassigned U.S. Pat. No. 3,687,646, which is incorporated herein by reference. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which dried sewage sludge having a solids content in the range of about 75-99 wt.% is used in the preparation of upgraded pumpable aqueous slurries of sewage sludge and solid carbonaceous fuel for use as fuel in a partial oxidation gasifier.

SUMMARY OF THE INVENTION

This relates to a partial oxidation process for disposing of sewage sludge without contaminating the environment comprising:

(1) dewatering sewage sludge to produce a stream of dewatered sewage sludge having a solids content in the range of about 17 to 40 wt.% and a separate stream of dried sewage sludge having a solids content in the range of about 75 to 99 wt.%;

(2) grinding the dried sewage sludge from (1) to a particle size so that 100 wt.% passes through ASTM E11 Standard Sieve Designation 1.40 mm.;

(3) producing a pumpable aqueous feed slurry for a partial oxidation gas generator, said feed slurry having a solids content in the range of about 45 to 70 wt.% by combining: (a) ground dried sewage sludge from (2), (b) dewatered sewage sludge from (1), and (c) an aqueous slurry of solid carbonaceous fuel having a higher heating value (HHV) of at least 7000 BTU/lb (dry basis), a solids content of about 50 to 70 wt.%, and a particle size so that 100 wt% passes through ASTM E11 Standard Sieve Designation 1.40 mm; wherein the materials (a), (b) and (c) are present in said aqueous feed slurry in the following ranges (parts by dry weight) (a) 0.5 to 2.0, (b), 0.5 to 2.0, and (c) 3.0 to 8.0; and said aqueous feed slurry has a higher heating value (HHV) of at least 6,000 BTU/lb (dry basis); and (4) reacting said pumpable aqueous feed slurry from (3) in the reaction zone of said partial oxidation gas generator at a temperature in the range of about 1800° F. to 3500° F. and a pressure in the range of about 1–35 atmospheres and in the presence of a free-oxygen containing gas, thereby producing a hot raw effluent gas stream of synthesis gas, reducing gas or fuel gas, along with non-contaminating ash and slag.

Another embodiment relates to a process for producing a pumpable fuel comprising a slurry of sewage sludge and solid carbonaceous fuel and reacting said slurry in a partial oxidation gas generator comprising:

(1) splitting a stream of dewatered sewage sludge having a solids content in the range of about 17 to 40 wt.% into a first stream comprising about 35 to 75 wt.% of the dewatered sewage sludge stream and a second stream comprising the remaining 65 to 25 wt.% of the dewatered sewage sludge stream;

(2) drying the first stream of dewatered sewage sludge to produce a stream of dried sewage sludge having a solids content in the range of about 75 to 99 wt.%:

(3) grinding the dried sewage sludge from (2) to a particle size so that 100 wt% passes through ASTM E11 Standard Sieve Designation 1.40 mm;

(4) mixing about 2.0 to 8.0 parts by weight (dry basis) of a solid carbonaceous fuel contained in an aqueous slurry having a solids content of about 50 to 70 wt.% with each part by weight of said second stream of dewatered sewage sludge from (1) to produce a slurry comprising sewage sludge and solid carbonaceous fuel having a solids content in the range of about 43 to 59 wt.%;

(5) heating the solid carbonaceous fuel-sewage slurry from (4) to a temperature in the range of about 140° F. to 212° F.; and mixing together about 3.0 to 8.0 parts by weight of the solid carbonaceous fuel-sewage sludge slurry from (4) with each part by dry weight of dried sewage sludge from (2) to produce a pumpable fuel slurry comprising sewage sludge and solid carbonaceous fuel and having a solids content in the range of about 45 to 70 wt.%; and (6) reacting said pumpable fuel slurry from (5) in the reaction zone of a partial oxidation gas generator at a temperature in the range of about 1800° F. to 3500° F. and a pressure in the range of about 1–35 atmospheres, and in the presence of free-oxygen containing gas, thereby producing a hot raw effluent gas stream of synthesis gas, reducing gas or fuel gas.

Still another embodiment relates to the aforesaid process but provides the steps of shearing the dewatered sewage sludge-containing materials at a temperature in the range of about ambient to 212° F. to produce a homogeneous pumpable material having a viscosity at 200° F. in the range of about 400 to 2,000 centipoise; and wherein said shearing takes place at a time with respect to the mixing of the dewatered sewage sludge-containing materials in (4) and/or (5) which is either (a) prior to said mixing, (b) simultaneous with said mixing, (c) after said mixing, or (d) any combination of (a), (b), and (c).

BRIEF DESCRIPTION OF THE DRAWINGS

The invention will be further understood by reference to the accompanying drawing. The drawing is a schematic representation of a preferred embodiment of the process.

DESCRIPTION OF THE INVENTION

Sanitary sewage sludge is disposed of by the process of the subject invention without polluting the nation's environment. In this process, dried ground sewage sludge having a solids content in the range of about 75 to 95 wt.% is mixed with dewatered sewage sludge having a solids content in the range of about 17 to 40 wt.%, and a solid carbonaceous fuel selected from the group consisting of coal, petroleum coke, and mixtures thereof to produce a pumpable aqueous slurry comprising sewage sludge and solid carbonaceous fuel. The parts by weight of solid carbonaceous fuel: dewatered sewage sludge: dried sewage sludge are respectively in the range of about 5 to 7:0.5 to 2:0.5 to 2, such as about 6:1:1. The aqueous slurry of sewage sludge and solid carbonaceous fuel is reacted with a free oxygen-containing gas by partial oxidation in a free-flow non-catalytic gas generator. Noxious sewage sludge is safely disposed of by the subject process without polluting the nation's environment. In addition, useful nonpolluting synthesis gas, reducing gas, or fuel gas is produced along with by-product steam and hot water. Non-contaminating ash and slag are separated from the gas stream. The ash and slag may be used for road bed fill and for making cement blocks. Further, the subject process allows a greater amount of sewage sludge to be fed to a partial oxidation gasifier, while requiring less energy per unit mass of sewage sludge processed.

A typical ultimate analysis of the combustibles in sewage sludge is shown in Table I. A typical ultimate analysis of inert non-combustible materials in sewage sludge is shown in Table II. The higher heating value (BTU/lb) of dry sewage sludge is in the range of about 3000 to 7000.

TABLE I

TYPICAL ULTIMATE ANALYSIS OF SEWAGE SLUDGE

| ELEMENT | WT. % |
|---|---|
| CARBON | 29–50 |
| HYDROGEN | 4–6 |
| NITROGEN | 4–5 |
| OXYGEN | 12–30 |
| SULFUR | 1–3 |
| ASH | 20–46 |

TABLE II

TYPICAL ANALYSIS OF INERT NON-COMBUSTIBLE MATERIALS IN SEWAGE SLUDGE

| ELEMENT | MG/KG DRY SOLIDS |
|---|---|
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of dewatered sewage containing about 17 to 40 wt.% of solids and coal that contain sufficient sewage sludge to be profitably burned are ordinarily too viscous to be pumped. This problem and others have been overcome by the subject invention.

In the subject process, pumpable slurries of sewage sludge and solid carbonaceous fuel are obtained by utilizing dried sewage sludge having a solids content in the range of about 75 to 99 wt.%. The dried sewage sludge is preferably obtained by drying a portion of dewatered sanitary sewage sludge having a solids content in the range of about 17 to 40 wt.%. In one embodiment, the dried sewage sludge is mixed with the dewatered sewage sludge. The resulting mixture is then mixed with an aqueous slurry of solid carbonaceous fuel, e.g., coal and/or petroleum coke. In another embodiment the dried sewage sludge is mixed with a heated mixture of dewatered sewage sludge and aqueous slurry of solid carbonaceous fuel. In still another embodiment, the dried sewage sludge is in admixture with sheared dewatered sewage sludge and an aqueous slurry of solid carbonaceous fuel. Other embodiments are also presented.

Sewage Sludge is produced by treating raw municipal sanitary sewage by conventional processing steps and equipment. For example, the sewage from municipal sewage lines is passed through bar screens for the removal of large pieces of stone, wood, metal, and other trash which would clog channels or damage pumps. Coarse heavy inorganic non-combustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened overflow from the grit chamber into a primary sedimentation tank such as a continuous clarifier as shown in Perry's Chemical Engineers' Handbook, McGraw-Hill, Fourth Edition, 1963, page 19–50. Detention time in the sedimentation tank is sufficient for producing a pumpable aqueous slurry of primary sludge having a solids content of about 0.5 to 20 wt.%, in about 1 to 24 hours. The primary sedimentation tank may also serve as a hold-up tank to even out discontinuities in the sewage composition. Alternatively, a separate holding tank may be used. In a preferred embodiment, a pumpable aqueous slurry of secondary sewage sludge is introduced into the holding tank and mixed with the primary sewage sludge. Secondary sewage sludge has a solids content in the range of about 1 to 10 wt.% and is derived from the liquid overflow from the previously mentioned primary sedimentation tank. The liquid overflow is processed in a conventional manner in order to produce secondary sewage sludge and to reduce the BOD and organic solids content and to purify and demineralize the waste water which is separated from the secondary sewage sludge. Treatment of the liquid overflow from the primary sedimentation tank may include a combination of any or preferably all of the following steps, depending upon the end use of the water: Ph adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. Nos. 3,687,646 and 4,933,086, which are incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, to preheat and thereby agglomerate the aqueous suspension of sewage sludge in a manner to be further described. Excess water may be discharged from the system or used externally for industrial applications.

The sludge underflow from the primary sedimentation tank comprising primary sewage sludge or from the holding tank comprising primary sewage sludge in admixture with about 0 to 50 wt.% (basis total sewage sludge) of secondary sewage sludge is dewatered further to produce a thickened aqueous suspension referred to herein as dewatered sewage sludge having a solids content in the range of about 17 to 40 wt.%, such as about 20 to 30 wt.%, say 25 wt.%. As previously mentioned, conventional means may be used to remove water including gravity settling, filtration, centrifugation, hydroclone, and combinations thereof. In the subject process, a portion of the dewatered sludge is concentrated further to produce a dried sewage sludge having a solids content in the range of about 75 to 99 wt.%.

When an aqueous suspension of ordinary sewage sludge having a solids content of above about 20 wt.% is mixed with coal, a very viscous slurry is produced. Thus, when an ordinary aqueous sewage sludge slurry is mixed with particles of coal or with an aqueous-coal slurry to form an aqueous sewage sludge-coal slurry having a solids content in the range of about 50 to 60 wt.% the resulting slurry is so viscous that it can not be pumped with any degree of reliability. However, this deficiency has now been overcome by the subject invention, for example by which a pumpable aqueous sewage sludge-coal and/or petroleum coke slurry having a total solids content of about 45 to 70 wt.% is produced. The percentage of solids in this slurry contributed to by the sewage sludge is in the range of about 10 to 40 wt.% (dry basis). The percentage of solids contributed to by the coal and/or petroleum coke (basis wt. of sewage sludge coal and/or petroleum coke slurry) is in the range of about 60 to 90 wt.%. This is an economical advantage because the profit that can be made from the subsequent gasification of sewage sludge is determined by the percentage of sewage sludge in the aqueous slurry of sewage sludge-coal and/or petroleum coke. The expression "and/or" is used herein in its normal sense. For example, it means a material selected from the group consisting of coal, petroleum coke, and mixtures thereof.

In one embodiment, it was unexpectedly found that a pumpable comparatively low viscosity e.g. about 400 to 2,000 centipoise aqueous slurry of sewage sludge having a solids content in the range of about 35 to 45 wt.%, say about 40 wt.%, and designated aqueous slurry of sewage sludge A may be produced by mixing together from about 40 to 60 wt.% on a dry basis of dewatered sewage sludge having a solids content in the range of about 17 to 40 wt.% and designated aqueous slurry of sewage sludge B, and about 60 to 40 wt.% of dried sewage sludge having a solids content in the range of about 75 to 99 wt.% and designated dried sewage sludge C. The dried sewage sludge C was preground to a particle size so that 100 wt.% passes through ASTM E11 Standard Sieve Designation 1.40 mm. The heat contents (Btu/lb) (dry basis) of the sewage sludge materials A, B, and C are in the range of about 4,000 to 7,000. A pumpable stream of sewage sludge may be produced by mixing these materials together at a temperature in the range of about 140° F. to 230° F. The individual components of the slurry or the mixture of components may be heated to provide this temperature. To increase the heat content of the aqueous slurry of sewage sludge A while maintaining the viscosity of the slurry, from about 50 to 80 wt.% (dry basis) of an aqueous slurry of solid carbonaceous fuel having a solids content in the range of about 50 to 70 wt.% and/or dry ground coal or petroleum coke is mixed with the aqueous slurry of sewage sludge A. For example, 1 part by dry weight of said mixture of dewatered sewage sludge and dried sewage sludge is mixed with about 1 to 8 parts by weight of dry ground coal or petroleum coke and/or an aqueous slurry of solid carbonaceous fuel having a solids content of about 50 to 70 wt.% (and a higher heating value of at least about 7,000 BTU/LB (dry basis). The solid carbonaceous fuel is coal and/or petroleum coke that is preground to a particle size so that 100 wt.% passes through an ASTM E11 Standard Sieve Designation 1.40 mm. United States Sieve Size #14. The term coal includes anthracite, bituminous, subbituminous, coke from coal, lignite, residue derived from coal liquefaction, and mixtures thereof. Petroleum coke is made from conventional delayed or fluid coking processes. The resulting pumpable aqueous slurry of sewage sludge and solid carbonaceous fuel has a solids content in the range of about 45 to 70 wt.% and has a higher heating value (HHV) of at least about 6000 BTU/LB (dry basis). The viscosity is in the range of about 400 to 2000 centipoise.

Accordingly, by dividing dewatered sewage sludge B into two parts, substantially drying the first part to only a trace of water to produce dried sewage sludge C, and blending back the dried sewage sludge with the dewatered sludge B, aqueous slurries of sewage sludge can be prepared with high concentrations that are pumpable. Apparently, drying alters the sludge in some way so that it does not thicken water to the same degree when reconstituted with water. Further, no commercial equipment is available that can be used to partially dry sludge on a controlled basis. In partially drying sludge, one encounters the so-called sticky phase at around 40–50 wt.% solids that is difficult to handle. Drying half the sludge to about 100 wt.% solids as provided in the subject process, circumvents these problems. The mixture of dewatered and dried sewage sludge streams B and C is then pumped by a high pressure sludge charge pump and mixed in-line with an aqueous coal and/or petroleum coke slurry stream from the coal slurry charge pump. The resulting, combined stream is then fed to the partial oxidation gasifier. This process allows for a higher content of sludge to be gasified while still dealing with a pumpable slurry. Thus, a greater amount of sewage sludge may be fed to the gasifier, while requiring less energy per unit mass of sludge processed. Further, the gasifier burner atomizes the fuel feedstream adequately to avoid any flame stability problems.

In the preferred embodiment of the subject invention described below, a portion of dewatered sewage sludge having a solids content in the range of about 17 to 40%, say about 25 wt.% is dried to about 75 to 99 wt.%, say about 95 wt.% solids. The remaining dewatered sewage sludge is premixed with an aqueous slurry of solid carbonaceous fuel e.g., coal and/or petroleum coke and heated. The 95 wt.% dried sludge is added to the dewatered sludge/solid carbonaceous fuel slurry, for example in the heater where it is heated to a temperature in the range of about 140° F. to 230° F., to produce a pumpable fuel feed for the partial oxidation gas generator. Waste heat from the sewage sludge-solid carbonaceous fuel gasification combined-cycle power plant is used to dry the dewatered sanitary sewage sludge. This process has the following advantages;

- A pumpable slurry of sewage sludge/solid carbonaceous fuel comprising at least 10 wt.% (dry basis) sewage sludge is produced for use as a fuel feedback to a partial oxidation process in which the noxious sewage sludge is disposed of without polluting the environment and clean fuel gas and/or synthesis gas is produced.
- By-product fuel gas may be used as fuel in a turboelectric generator. By-product synthesis gas may be used in the catalytic synthesis of organic chemicals e.g. methanol.
- The process utilizes waste heat derived from flue gas. Normally, this heat is rejected to the atmosphere, since it is at too low of a temperature to be economically recovered into the power cycle. Steam may be produced for heating dryers and for use as the working fluid in an expansion turbine.
- A low-temperature, direct-contact dryer is used to dry the sludge. This type of dryer emits very low levels of contaminants (e.g. mercury and dioxins) in the dryer off gas. Also, the BOD of the condensate stream is extremely low.
- The slag produced during the partial oxidation of the mixed feed of sludge and solid carbonaceous fuel is free of pollutants, and is non-hazardous. Further, it is non-leachable.
- The process has a high thermal efficiency. Internally generated waste heat is used to dry the sewage sludge, and to improve the fluidity of the slurry fuel streams.
- Drying sewage sludge, as employed in the subject process: (1) destroys cells and organisms, (2) denatures proteins, and (3) changes its moisture absorbing and slurrying properties.

Water vapor in the offgas from the indirect air dryer and moving belt drying systems used to produce said dried sewage sludge is condensed. The noncondensibles are then further treated by one of several conventional odor control systems. The condensed water is then treated by conventional biological treatment. Sludge from the direct air dryer is then ground in conventional size reduction equipment, such as a drygrind ball mill. From the grinder, the dry, ground sludge is conveyed to a mix tank.

The previously described remaining split stream of dewatered sewage sludge in admixture with aqueous slurry of solid carbonaceous fuel is passed through a heat exchanger and heated to a temperature in the range of about 140° F. to 230° F. The mixture is indirectly contacted with steam. The steam is produced downstream in the process in a heat recovery steam generator wherein thermal energy is recaptured from turbine exhaust gas. A variety of equipment is available commercially that would be suitable for the heat exchanger service. This includes double-pipe exchangers, scraped-surface exchangers, screw exchangers, thermal-disk exchangers, and so-called porcupine processors. The heated sewage sludge/solid carbonaceous fuel slurry is then mixed with the dried sludge at a temperature of about 210°-220° F. Data has shown that this slurry will be pumpable by conventional, crank-shaft-driven, positive-displacement pumps, which are the standard pumps for charging a gasifier.

In another novel embodiment of the subject invention, dewatered sewage sludge having a solids content in the range of about 17 to 40 wt.% is sheared at a temperature in the range of about ambient to 212° F., such as about 180° F. to 212° F., say about 200° F., while in admixture with ground dried sewage sludge having a solids content in the range of about 75 to 99 wt.% and/or aqueous slurry of solid carbonaceous fuel, e.g., coal and/or petroleum coke having a solids content in the range of about 50 to 70 wt.%. The mixture is subjected to a shear stress in a conventional shearer for a sufficient period e.g. about 1 to 180 minutes to produce a pumpable homogeneous slurry material having a viscosity in the range of about 400 to 2000 centipoise at about 212° F. For example, shearing may take place in a ribbon mixer, a mixing tank equipped with a high speed propeller or in one of a number of conventional machines designed to continuously m.x and shear solids or concentrated slurries e.g. steam jacketed ribbon mixer or steam jacketed shearing device—such as the Continuous Processor manufactured by the Teledyne Readco Co.

It was unexpectedly found that, if necessary, the viscosity of the mixture comprising dried sewage sludge, dewatered sewage sludge and the aqueous slurry of coal and/or petroleum coke may be reduced to a value in the pumpable range e.g. less than about 2000 centipoise, such as about 800 to 1600 cp, say about 1000 to 1200 cp by first applying a shear stress to the dewatered sewage sludge, and then making a pumpable mixture by adding dried sludge and coal or coal-water slurry. The shearing may take place with or without heating either prior to, during, and/or after the time that the dewatered sewage sludge, is mixed with the dried sewage sludge and/or solid carbonaceous fuel or an aqueous slurry of solid carbonaceous fuel. Shearing of the dewatered sludge or the sludge mixtures takes place at a temperature in the range of about ambient to 212° F., such as about 180° F. to 212° F., such as about 200° F. Shearing times are in the range of about 5 to 180 minutes. Preferably, shearing takes place without the loss of water. Stirring at about 400 rpm in an autoclave will provide a shear stress of about 60 per second. By shearing, a homogenous pumpable material is produced having a viscosity in the range of about 400 to 2000 centipoise at a temperature of about 200° F. Further, shearing of the dewatered sewage sludge having a solids content in the range of about 17 to 40 wt.% takes place either before, during, or after the time that the dewatered sewage sludge is mixed with the pumpable slurry of solid carbonaceous fuel having a solids content in the range of about 50 to 70 wt.% and/or dried sewage sludge having a solids content in the range of about 75 to 99 wt.%. Thus, shearing of the dewatered sewage sludge may take place before the aforesaid mixing and then again after the dewatered sewage sludge, dried sewage sludge, aqueous slurry of solid carbonaceous fuel, or mixtures thereof have been mixed together.

In one experiment, a one liter polymer kettle 4 inches in diameter and equipped with a Jiffy mixer having a 2.5 inch diameter propeller and two 2.5 inch high knife edge side pieces was used for the mixing and shearing. The torque encountered by the stirrer was measured and transmitted to a readout device. This torque was directly correlated with viscosity. The sludge was sheared at 1.0 to 700 rpm to attain a constant viscosity in 60-90 minutes. Preferred shear rates are at least 700 rpm for a period in the range of about 5 min to 180 min. For additional information on shearing sewage sludge, see coassigned U.S. Pat. Nos. 4,933,086 and 4,983,296, which are incorporated herein by reference.

Runs 1 to 3 below are summarized in Table III. Run No. 1—Dewatered sewage sludge having a solids content of about 25 wt.% was sheared in the aforesaid Jiffy mixer, while being heated at 212° F. until a constant viscosity was reached (380 cp). Dried sewage sludge having a solids content of about 95 wt.% was added and the mixture was sheared until a constant viscosity was reached (970 cp). Surprisingly, when ground coal was added to the mixture, the viscosity did not increase. It was found that the coal slurries much better than the other components of the mixture and dilutes their deleterious effects as more coal is added. An ultimate pumpable slurry having an apparent viscosity of 590 cp was obtained.

Run No. 2—Dewatered sewage sludge was sheared at 700 rpm as previously described to a constant viscosity (120 minutes). The dried sewage sludge and aqueous coal slurry were then added. This afforded a pumpable mixture with a total solids content of 52 wt.% and a viscosity of about 380 cp.

Run No. 3—Dewatered sewage sludge, dried sewage sludge, and coal water slurry having the previously described solids content were mixed together at the start and sheared at 700 rpm for 60 minutes. The total solids in the mixture was 53.7 wt.% and its final pumpable viscosity was 400 cp.

TABLE III

Viscosities of Dewatered Sewage Sludge/Dried Sewage Sludge/Coal-Water Mixtures

| Added Component | Constant % Total Solids | Minimum Time to Vis At 700 rpm | Constant Vis. cp | Coal/ Sludge Ratio |
|---|---|---|---|---|
| Run No. 1 Stage | | | | |
| I Raw LA County Sewage Sludge (25.9) (a) | 22.9 | 100 | 380 | 1.23 |
| II Dried Sewage Sludge (18.9) | 32.9 | 110 | 970 | |
| III Pittsburgh #8 Coal (55.2) | 40.5 | 90 | 950 | |
| IV Pittsburgh #8 Coal (55.2) | 46.9 | 90 | 630 | |
| V Pittsburgh #8 Coal (55.2) | 52.0 | 0 | 900 | |
| Run No. 2 Stage | | | | |
| I Raw LA County Sludge | 22.9 | 120 | 180 | 1.27 |
| (25) | | | | |
| II Dried Sewage Sludge (19) and Coal (56) | 52 | 100 | 380 | |
| Run No. 3 | | | | |
| Raw LA City Sludge (17.1) Dried Sewage Sludge (20.4) Coal (62.3) | 53.7 | 60 | 400 | 1.65 |

(a) Numbers in parenthesis are the percentage of that component in the final mixture.

Shearing sludge at modest temperatures (70° to 212° F.) and atmospheric pressure changes solid amorphous sewage sludge cake to a homogenous material with the consistency of a heavy pudding or motor grease having a 200° F. viscosity of about 200 to 700 cp depending on solids concentration and sludge origin.

A satisfactory pumpable aqueous slurry feed for the partial oxidation gasifier contains about 45 to 70 wt.% solids. These solids, noted on a dry basis are comprised of about 50 to 80 wt.%, such as about 75 wt.% slurry of coal and/or petroleum coke; about 10 to 25 wt.%, such as about 12.5 wt.% dewatered sewage sludge (17-40 wt% solids); and about 10 to 25, such as about 12.5 wt.% dried sewage sludge (about 75-99 wt.% solids).

The fuel feedstream, for example the aqueous slurry of sewage sludge and coal and/or petroleum coke and a stream of free-oxygen containing gas are introduced into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference.

A two, three or four stream annular type burner, such as shown and described in coassigned U.S. Pat. Nos. 3,847,564; 3,874,592 and 4,525,175, which are incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e., greater than 21 mole % $O_2$, and air. The free-oxygen containing gas is supplied at a temperature in the range of about 100° F. to 1000° F. The aqueous slurry of sewage sludge and coal and/or petroleum coke is passed through the intermediate annular passage 16 at a temperature in the range of about ambient to 650° F.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

In one embodiment, a pumpable fuel slurry comprising sewage sludge and solid carbonaceous fuel as produced by the subject process is introduced into the reaction zone of the partial oxidation gasifier by way of one passage of a 2-passage annular-type burner, as shown in U.S. Pat. No. 3,874,592. The free-oxygen containing gas is passed through the other passage. In still another embodiment, the pumpable slurry fuel comprising sewage sludge and solid carbonaceous fuel, as produced by the subject process, is introduced into a partial oxidation gasifier or into a boiler or incinerator where complete combustion takes place by way of a 4-stream annular-type burner, such as described in coassigned U.S. Pat. No. 4,525,175. A gaseous fuel selected from the group consisting of Natural gas, Refinery gas, Fuel gas as produced by the subject process in the Partial Oxidation reaction zone, and mixtures thereof is passed through the central conduit of the 4-stream burner to assist in sustaining the gasification reaction. Free-oxygen containing gas is passed through the inner and outer-most annular passages, and the pumpable aqueous slurry of sewage sludge and solid carbonaceous fuel, as produced by the subject process, is passed through the intermediate annular passage.

The relative proportions of the fuel, water and oxygen in the feedstreams to the gas generator are carefully regulated to convert a substantial portion of the carbon in the fuel, e.g. up to about 90% or more by weight, to carbon oxides; and to maintain an autogenous reaction zone temperature in the range of about 1800° F. to 3500° F. and a pressure in the range of about 1 to 35 atmospheres. Preferably the temperature in the gasifier is in the range of about 2200° F. to 2800° F., so that molten slag is produced. Further, the weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 40, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, CH 0 to 2, 1 $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. Coal has a high ash content e.g. about 10 to 30 wt.%. It was unexpectedly found that advantageously the coal ash will encapsulate the non-combustible materials in the sewage sludge. The encapsulated material will flow from the reaction zone of the gas generator as substantially inert molten slag. In the various embodiments herein, the solid carbonaceous fuel may be provided as a pumpable slurry of coal and/or petroleum coke in a liquid medium selected from the group consisting of water, liquid hydrocarbon, liquid hydrocarbonaceous fuel, and mixtures thereof.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream may be cleaned and purified by conventional methods. For example, reference is made to coassigned U.S. Pat. No. 4,052,176, which is included herein by reference for removal of $H_2S$, COS and $CO_2$, from the effluent gas stream in a conventional gas purification zone.

In one embodiment, an additive is introduced into the partial oxidation reaction zone along with the other feed materials in order to facilitate the encapsulation and removal as inert molten slag of the non-combustible materials found in the sewage sludge and in the ash of the solid carbonaceous fuel. The additive is selected from the group consisting of iron-containing material, calcium-containing material, silicon-containing material and mixtures thereof. About 0.1 to 10 parts by weight of additive is introduced into the gasifier for each part by weight of non-combustible materials. The ironcontaining additive material is for example selected from the group consisting of iron, iron oxide, iron carbonate, iron nitrate, and mixtures thereof. The calcium-containing additive material is for example selected from the group consisting of calcium oxide, calcium hydroxide, calcium carbonate, calcium nitrate, calcium fluoride, calcium phosphate, calcium borate, and mixtures thereof. The silicon-containing additive material is for example selected from the group consisting of silica, quartz, silicates, volcanic ash, and mixtures thereof Clean synthesis gas as produced in the subject process may be used in the catalytic synthesis of organic chemicals. For example, methanol and acetic acid may be synthesized in accordance with the process described in coassigned U.S. Pat. No. 4,081,253, which is incorporated herein.

Fuel gas produced in the subject process may be burned in the combustor of a gas turbine. Flue gas from the gas turbine may be the working fluid in an expansion turbine which powers an electric generator. The thermal energy in the turbine exhaust gas may be recovered in a heat recovery steam generator (HRSG). For example, by indirect heat exchange with boiler feed water and the turbine exhaust gas, streams of low, medium and superheated steam may be produced for use in the process. Then in a waste heat recovery unit (WHRU), steam condensate is passed in indirect heat exchange with the exhaust gas leaving the HRSG unit to produce saturated steam. The temperature of the steam may be increased in a trim heater to produce saturated medium pressure steam at approximately 300 psig. The steam may be used to heat the air, which is then passed in direct heat exchange with dewatered sewage sludge. Dried sewage sludge having a solids content in the range of about 75 to 99 wt.% may be thereby produced.

BRIEF DESCRIPTION OF THE DRAWING

A more complete understanding of the invention may be had by reference to the accompanying drawing which illustrates a preferred embodiment of the invention. It is not intended to limit the subject invention to the particular process or materials described.

Dewatered municipal sanitary sewage sludge having a solids content in the range of about 17 to 40 weight %, say about 25 wt.%, and at a temperature in the range of about ambient to 212° F., say about 70° F. in line 1 is split into two streams. From about 35 to 75 wt.%, such as about 45 to 55 wt.%, say about 50 wt.% of the dewatered sewage sludge in line 1 is passed through line 2 and into low temperature direct air dryer 4. Air at ambient temperature in line 5 is passed through indirect heater 6, and heated to a temperature of about 250° F.

by indirect heat exchange with steam entering by way of line 7. This steam is produced downstream in the process in waste heat recovery unit (WHRU) 73. Heated air leaves air heater 6 through line 10 and enters dryer 4 by way of lines 11-14, at a temperature in the range of about 175° to 250° F., such as about 185° to 195° F., say about 190° F. The dewatered sewage sludge moving through dryer 4, on belt 15, is directly contacted and dried by the hot air passing up through dryer 4.

Off-gas at a temperature in the range of about 135° to 195° F., say about 1°-65° F. leaves from the top of dryer 4 by way of line 16, and is directed to a conventional gas scrubbing and purification unit (not shown). Ceiling fans 17 circulate the hot air and facilitate the drying of the sludge in dryer 4. Alternatively, direct dryer 4 may be replaced by an indirect steam heated dryer (not shown). Dried sewage sludge having a solids content in the range of about 75 to 99 wt.%, such as about 92 to 98 wt.%, say about 95 wt.% in line 18 is introduced into a conventional grinder 19. The dried sewage sludge is ground to a particle size so that 100 wt% passes through ASTM E11 Standard Sieve Designation 1.40 mm. Dried ground sewage sludge in line 20 is introduced into mixing tank 21. Motor driven agitator 22 is provided in mixing tank 21.

The remainder e.g., about 25 to 65 wt.% of the stream of dewatered municipal sanitary sewage sludge from line 1 is passed through line 30, valve 31, line 32 and mixed in-line mixer 33, with an aqueous slurry of solid carbonaceous fuel e.g., coal slurry from line 34. Other conventional mixing devices designed for rapid mixing of solids and/or viscous fluids e.g. ribbon mixer may also be used. The solids content of the aqueous slurry of solid carbonaceous fuel in line 34 is in the range of about 50 to 70 wt.%, such as about 66 to 68 wt.%, say about 65 wt.%. The water used to prepare said aqueous slurry may be fresh water; but, advantageously it could be recycled water that may be a waste stream that would otherwise require treatment before being discharged into the environment. The temperature of the aqueous slurry in-line 34 is in the range of about ambient to 180° F., such as about 50 to 180° F. About 2 to 8 parts by dry weight of a solid carbonaceous fuel e.g. coal and/or petroleum coke either dry or contained in a aqueous slurry is mixed with each part by weight of said second stream of dewatered sewage sludge. The pumpable mixture of aqueous coal slurry and dewatered sludge in line 32 has a solids content in the range of about 40 to 60 wt.% and a temperature in the range of about 70° to 120° F., say about 109° F. This mixture of sewage sludge and solid carbonaceous fuel is passed through heater 35 where it is heated to a temperature in the range of about 140° to 230° F., say about 180° F. by indirect heat exchange with steam. The steam was previously produced downstream in the process, for example in heat recovery steam generator 61. At a temperature in the range of about 250° to 400° F., say about 300° F., it is passed into heater 35 by way of line 36. Condensed steam leaves through line 37 at substantially the same temperature as the entering temperature. About 3 to 9 parts by dry weight of the mixture of dewatered sewage sludge and solid carbonaceous fuel in line 38 at a temperature in the range of about 140° F. to 230° F. is introduced into mix tank 21. It is mixed therein with each part by dry weight of the dried sewage sludge from lines 20 and 95. The dried ground sewage sludge enters mix tank 21 at a temperature in the range of about 180° to 250° F. The pumpable aqueous slurry fuel mixture of sewage sludge and solid carbonaceous fuel e.g., coal from mix tank 21 is passed through line 39 into slurry storage tank 40.

At a temperature in the range of about 140 to 212° F., say about 180° F., the pumpable slurry fuel feed comprising a mixture of sludge and solid carbonaceous fuel is passed through line 41 and a conventional partial oxidation burner (not shown) into a conventional free-flow noncatalytic partial oxidation gasification unit 42. There, the slurry fuel feed is reacted by partial oxidation with a free oxygen containing gas which is being simultaneously passed through line 50 and said burner into gasification unit 42. The free-oxygen containing gas in line 50 is at a temperature in the range of about 120° to 300° F., such as about 200° F. The raw fuel gas produced in unit 42 and substantially comprising $H_2$, CO, $CO_2$, $H_2O$ and CH is passed through line 51 and conventional gas cooling, cleaning and purifying units 52. Clean synthesis gas, reducing gas or fuel gas is thereby produced. During the cooling of the hot raw effluent gas stream from the gasifier by direct quenching in water or by indirect heat exchange in a waste heat boiler, steam at a temperature in the range of about 250° to 800° F. and/or hot water at a temperature in the range of about 250° to 350° F. are produced and leave by line 53. These waste heat streams may be used elsewhere in the process, for example in heat exchangers such as dryer 4 and/or heater 6. The clean fuel gas is passed through lines 55 and 56 at a temperature in the range of about 80° to 550° F., say about 305° F., and into combustor 57. Complete combustion of the fuel gas with air from line 58 takes place in combustor 57. The flue gas produced is passed through expander 59, which is mechanically linked to drive electric generator 63. Hot turbine exhaust gas leaves through line 60 at a temperature in the range of about 800° to 1400° F., say about 1050° F. The thermal efficiency of the subject process is substantially improved by recovering thermal energy from the hot exhaust gas by indirect heat exchanger in heat recovery steam generator (HRSG) 61. Optionally, a portion of the clean gas stream comprising $H_2$ and CO in line 55 is passed through line 62, and used for the catalytic synthesis of organic chemicals. For example, see coassigned U.S. Pat. No. 4,081,253, which is incorporated herein by reference, for the synthesis of methanol. A portion of the boiler feed water in line 65, such as condensate from the turbine exhaust stream, is converted into low pressure steam in coil 66, and leaves through line 67 to preheat boiler feed water. Another portion of the boiler feed water from line 65 is converted into medium pressure steam in coil 68 and leaves through line 69 for use as the heating fluid in sludge/coal heater 35. A portion of the saturated steam produced in coil 68 is converted into superheated steam in coil 70 and leaves through line 71 for expansion in a steam turbine for producing electricity. The partially cooled turbine exhaust gas leaves HRSG 61 through line 72 at a temperature in the range of about 300° to 450° F., say about 336° F. and passes through waste heat recovery unit (WHRU) 73. Steam condensate in line 74, at a temperature in the range of about 85° to 250° F., say abut 110° F. is heated to a temperature in the range of about 180° to 325° F., say about 275° F. by indirect heat exchange with the HRSG exhaust gas from line 72. Additional heat may be provided to the water leaving WHRU 73 by way of line 75 in trim heater 76. Steam at a temperature in the range of about 250° to 600° F., say about 350° F. in line 7 is thereby produced and passed through indirect air heater 6, as described previously. Condensate leaves air heater 6 through line 77 at a temperature in the range of about 85° to 250° F., say about 130° F., and may be recycled to WHRU 73 by way of line 74. The exhaust gas leaving WHRU through line 78 at a temperature in the range of about 200° to 450° F., say about 250° F. and is sent to the stack.

In another embodiment, the dewatered sewage sludge from line 1 is sheared and then mixed with the aqueous slurry of solid carbonaceous fuel and/or dried sewage sludge. Accordingly, with valves 31 and 93 closed and valve 82 open, dewatered sewage sludge in line 1 is passed through lines 2, 81, valve 82 and into a conventional shearer 83. The sheared dewatered sewage sludge is then passed through lines 85, 86, valve 87, line 88 and mixed in line 32 and in in-line mixer 33 with the aqueous coal slurry from line 34. This mixture is then processed in a manner as described before. Alternatively, with valve 87 closed the sheared stream of dewatered sewage sludge in line 85 may be passed through line 90 and 91 and/or 92 and open valves 93 and or 94. For example, with valve 94 closed and valve 93 open, the sheared dewatered sewage sludge in line 90 is mixed in line 95 with ground dried sewage sludge from line 20. The mixture is then introduced into tank 21 where processing takes place in the manner previously described. Alternatively, with valve 93 closed and valve 94 open, the sheared dewatered sewage sludge in line 90 may be passed through lines 92 and 96 and directly into tank 21. Optionally, dry ground solid carbonaceous fuel e.g. coal with a maximum size of ASTM E11 Standard Sieve Designation 1.40 mm in line may be introduced into tank 21 in addition to, or in place of the aqueous coal slurry in line 34. Cold water for gas quenching in a conventional quench tank or boiler feed water for gas cooling in a waste heat boiler is introduced into unit 52 by way of line 98.

The process of the invention has been described generally and by examples with reference to materials of particular composition for purposes of clarity and illustration only. It will be apparent to those skilled in the art from the foregoing that various modifications of the process and materials disclosed herein can be made without departure from the spirit of the invention.

We claim:

1. A process for the partial oxidation of sewage sludge and the production of clean synthesis gas, fuel gas, and electrical power without polluting the nation's atmosphere comprising:

(1) splitting a stream of dewatered sewage sludge having a solids content in the range of about 17 to 40 wt.% into a first stream comprising about 35° to 75 wt.% of the dewatered sewage sludge stream and a second stream comprising the remaining 65 to 25 wt.% of the dewatered sewage sludge stream;

(2) drying the first stream of dewatered sewage sludge to produce a stream of dried sewage sludge having a solids content in the range of about 75 to 99 wt.%:

(3) grinding the dried sewage sludge from (2) to a particle size so that 100 wt% passes through ASTM E11 Standard Sieve Designation 1.40 mm;

(4) mixing about 2.0 to 8.0 parts by dry weight aqueous slurry of solid carbonaceous fuel having a solids content of about 50 to 70 wt.% with each part by weight of said second stream of dewatered sewage sludge from (1) to produce a slurry comprising sewage sludge and solid carbonaceous fuel having a solids content in the range of about 40 to 60 wt.%;

(5) heating the solid carbonaceous fuel-sewage slurry from (4) to a temperature in the range of about 140° F. to 212° F.; and mixing together 3 to 9 parts by dry weight of the solid carbonaceous fuel-sewage sludge slurry from (4) with each part by weight of dried sewage sludge from (2) to produce a pumpable fuel slurry comprising sewage sludge and solid carbonaceous fuel and having a solids content in the range of about 45 to 70 wt.%; and (6) reacting said pumpable fuel slurry from (5) in the reaction zone of a partial oxidation gas generator at a temperature in the range of about 1800° F. to 3500° F. and a pressure in the range of about 1-35 atmospheres, and in the presence of free-oxygen containing gas, thereby producing a hot raw effluent gas stream of synthesis gas, reducing gas or fuel gas.

(7) cooling, cleaning and purifying said raw effluent gas stream to produce a stream of fuel gas;

(8) burning the fuel gas from (7) with air in a combustor of a gas turbine, and passing the hot exhaust gas through an expansion turbine which drives an electric generator; and (9) passing the hot exhaust gas from (8) in indirect heat exchange with water to produce steam for use in drying said first stream of dewatered sewage sludge in (2) and/or for heating said solid carbonaceous fuel-sewage slurry is (5) by indirect heat exchange.

2. The process of claim 1 provided with the step of shearing said second stream of dewatered sewage sludge from (1) at a temperature in the range of about ambient to 212° F. to produce a homogeneous pumpable material having a viscosity of about 400 to 2000 centipoise at 200° F., and wherein said shearing takes place at a time with respect to the mixing of the dewatered sewage sludge in (4) and/or (5) which is either (a) prior to said mixing, (b) simultaneous with said mixing, (c) after said mixing, or (d) any combination of (a), (b), and (c).

3. The process of claim 1 provided with the step of introducing said pumpable fuel slurry from (5) into the reaction zone of a partial oxidation gas generator by way of the intermediate annular shaped passage of a four-stream annular-type burner comprising a central conduit surrounded by three concentric annular-shaped passages while simultaneously passing free-oxygen containing gas through the inner and outermost annular shaped passages, and passing a gaseous fuel selected from the group consisting of natural gas, refinery gas, fuel gas as produced by the subject process in the partial oxidation reaction zone, and mixtures thereof through the central conduit.

* * * * *